United States Patent [19]
Ivary

[11] 3,762,324
[45] Oct. 2, 1973

[54] VISCOUS FLUID THICKNESS GAUGE
[75] Inventor: David J. Ivary, Pinesville, Ohio
[73] Assignee: Addressograph-Multigraph Corporation, Cleveland, Ohio
[22] Filed: July 29, 1971
[21] Appl. No.: 167,336

[52] U.S. Cl............. 101/350, 33/142, 101/363, 101/426
[51] Int. Cl..... B41f 31/30, B41f 33/10, B41f 33/14
[58] Field of Search ............ 118/4, 7, 9, 10; 235/103, 103.5; 73/150, 507; 72/16; 101/350, 426, 181, 185; 346/74

[56] References Cited
UNITED STATES PATENTS

| | | | |
|---|---|---|---|
| 3,176,307 | 3/1965 | Dunlavey | 346/74 |
| 3,130,303 | 4/1964 | Dobbins | 118/9 |
| 3,289,581 | 12/1966 | Roozee | 118/9 |
| 3,172,208 | 3/1965 | Lowy | 235/103.5 R |
| 1,039,564 | 9/1912 | Matthews et al. | 235/103.5 R |
| 1,419,253 | 6/1922 | Grey | 235/103 |
| 3,582,969 | 6/1971 | Kinney | 235/103 |
| 3,046,935 | 7/1962 | Wilson | 118/7 |
| 2,211,657 | 8/1940 | Hudson | 235/103.5 R |
| 3,584,579 | 6/1971 | Rothenberg | 101/350 |
| 3,368,399 | 2/1968 | Wirz | 73/150 |
| 2,971,461 | 2/1961 | Bradford | 118/9 |

FOREIGN PATENTS OR APPLICATIONS 974,565  11/1964  Great Britain ................... 118/9

Primary Examiner—Robert E. Pulfrey
Assistant Examiner—William Pieprz
Attorney—Russell L. Root et al.

[57] ABSTRACT

A viscous fluid thickness gauge is disclosed capable of measuring the thickness of a viscous fluid on a roll while the roll is rotating at any speed. The thickness gauge can be continuously monitored and has an output capable for use as a control function. The invention is suitable for use with a printing machine to measure the ink thickness on a printing roll.

1 Claim, 2 Drawing Figures

PATENTED OCT 2 1973 3,762,324

DAVID J. IVARY
INVENTOR
BY Ray S Pyle
ATTORNEY

VISCOUS FLUID THICKNESS GAUGE

BACKGROUND OF THE INVENTION

This invention relates to thickness gauges and more particularly to thickness gauges suitable for measuring the thickness of viscous fluids.

The prior art has known many methods of measuring the thickness of a viscous fluid. These measurements are extremely important in the areas of coating machines and printing machines, for example, where small variations in the thickness of a viscous fluid on a roll will cause a significant difference in the end product. Most of the prior art methods for measuring the thickness of a viscous fluid have been hand-held gauges. These gauges were not accurate and the readings would vary with the individual performing the measurement. Another disadvantage of the prior art viscous fluid thickness gauges was that the output was only visual and provided no capability to use the output as a control function, such as connecting the output back to control a viscous fluid supply. Finally, the viscous fluid thickness gauges of the prior art generally had to be used when the machine was not in operation.

Therefore, an object of this invention is to produce a viscous fluid thickness gauge which is suitable for use with printing machines to measure the ink thickness on a printing roll.

Another object of this invention is to produce a viscous fluid thickness gauge which is capable of measuring thickness when the machine is running.

Another object of this invention is to produce a viscous fluid thickness gauge which is accurate and which will give consistent measurements.

Another object of this invention is to produce a viscous fluid thickness gauge having an output capable for use as a control function.

Another object of this invention is to produce a viscous fluid thickness gauge which can be continuously monitored.

Another object of this invention is to produce a viscous fluid thickness gauge which is low in cost.

SUMMARY OF THE INVENTION

The invention may be incorporated in a printing machine viscous fluid thickness gauge, comprising in combination, a first and a second roll, means applying a viscous fluid on one of said rolls, said vsicous fluid changing the effective radius of said one of said rolls in relation to the thickness of said fluid thereon, said second roll being movable and effectively in contact with said first roll, and means responsive to the movement of said second roll relative to said first roll to detect the thickness of said fluid on said one of said rolls.

Other objects and a fuller understanding of the invention may be had by referring to the following description and claims, taken in conjunction with the accompanying drawing.

DESCRIPTION OF THE PREFERRED EMBODIMENT

Figure 1:
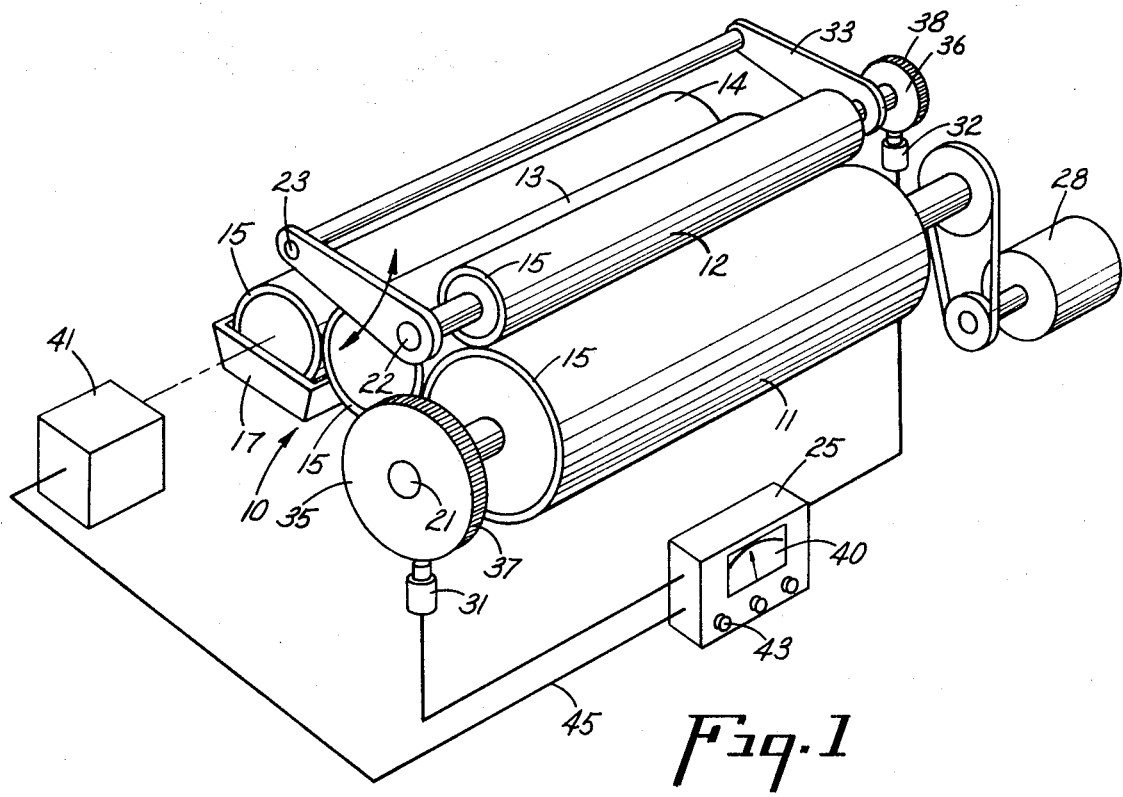
FIG. 1 is the preferred embodiment of the present invention.

The preferred embodiment, FIG. 1, illustrates roll means 10 which includes a first and a second endless surface 11 and 12, respectively, each of which has a radius at one location. The endless surfaces 11 and 12 are shown as being circular in cross-section and can be considered a first and a second roll. The first roll 11 is shown to have a different radius from the second roll 12. Means 28 rotates a roll of the roll means 10 and is shown as a motor to rotate the first roll 11 about a first axis 21. However, any of the rolls in the roll means 10 could have been selected to be rotated by the means 28 or any other means.

The drawing of FIG. 1 also illustrates means 13 applying a viscous fluid 15 on one of the first and second rolls 11 and 12. In this example, the means 13 is a third roll which is simultaneously in contact with the first roll 11 and a fourth roll 14. A viscous fluid 15 contained in a viscous fluid supply 17 adheres to the surface of the fourth roll 14 and is transferred to the third roll 13. The third roll 13 transfers the viscous fluid to the first roll 11. This viscous fluid 15, for example, can be printing ink contained in an ink supply 17. The presence of the viscous fluid 15 on the outer surface of the first roll 11 changes the effective radius of the roll in relation to the thickness of the fluid thereon. Thus, the effective radius of a roll is equal to the radius of that roll plus the thickness of viscous fluid upon that roll.

The second roll 12 is shown in FIG. 1 to be supported by a member 33 to be movable and effectively in contact with the first roll 11. The first and second rolls 11 and 12 are said to be in effective contact since the effective radii of the first and second rolls are in contact. The second roll 12 can be rotated about a second axis 22 which axis is movable or rotatable about a third axis 23. Changes in the effective radius of the first roll 11 caused by the presence of a viscous fluid 15 thereon, will be compensated for by the movement of the second axis 22 about the third axis 23 as indicated by the arrows. The layer of ink 15 which is interposed between the first and second rolls 11 and 12 prevents the first and second rolls from being in contact with one another, but the second roll 12 is in contact with the interposed ink layer 15 which places the first and second rolls in effective contact with one another.

The position of rolls 11 and 12 illustrate a means relating the surface speeds of the endless surfaces, in this case the peripheral speeds of the first and second rolls 11 and 12 and transferring the viscous fluid 15 between the first and second rolls. This means of transferring viscous fluid and relating the peripheral speeds includes positioning the first and second rolls 11 and 12 such that the effective radii are in contact. If the second roll 12 is constructed out of the proper material, the viscous fluid will be transferred from the first roll 11 to the second roll 12 until an equilibrium is established. A characteristic which has been observed in the operation of the invention shown in FIG. 1 indicates that the viscous fluid is transferred between the two rolls in contact until an equal thickness is established on each roll. When the viscous fluid is transferred from the first roll 11 to the second roll 12, the presence of the viscous fluid on the surface of the rolls will change the effective radii of both of the rolls in relation to the thickness of the viscous fluid thereon. Concomitantly, the contact of the effective radii of the first and second rolls 11 and 12 produces sufficient frictional and viscous forces to cause the second roll 12 to rotate and relate the peripheral speeds of the first and second rolls 11 and 12. When the first and second rolls 11 and 12 are in effective contact with one another, the peripheral speeds are substantially the same since a negligible slippage condition exists at the viscous fluid layer interposed between the first and second rolls. The second roll 12 rotates at a speed which is determined by the radius of the first and second rolls, the angular speed of the first roll 11 and the thickness of the viscous fluid 15. The means transferring viscous fluid between and relating the peripheral speeds of the first and second roll can also be accomplished by placing the first and second rolls in contact with a single or a plurality of rolls interposed between the first and second rolls 11 and 12. A similar phenomena of transferring and relating occurs at the interface of the first roll 11 and the third roll 13 and the interface between the third roll 13 and the fourth roll 14. Thus, it is only necessary to have a means to rotate a single roll of the roll means 10 in order to effect the rotation of the rolls and the transfer of viscous fluid among the roll means.

FIG. 1 also includes means 25 responsive to the movement of the second roll 12 relative to the first roll 11 to detect the thickness of the fluid 15 on one of the first and second rolls 11 and 12. This means 25 includes detecting the relative separation of the first and second axes 21 and 22 or comparing the angular speeds of the first and second rolls 11 and 12. Means 28 rotates the first roll, and in general will rotate the first roll at a substantially constant speed for a given length of time.

The angular speeds of the first and second rolls 11 and 12 can be compared by mechanical or electronic means. FIG. 1 illustrates one method of comparing the angular speeds of the first and second rolls; namely, through the use of the sensors 31 and 32. The sensors 31 and 32 can be capacitive, magnetic, optical or the like, but are shown in FIG. 1 as magnetic sensors. A first and a second gear 35 and 36 having teeth 37 and 38 rotate in unison with the first and the second rolls 11 and 12, respectively. The magnetic sensors 31 and 32 are sensitive to the teeth of the gear as they pass in front of the sensor.

Magnetic sensors of the type used include a conductive wire coiled around a permanent magnet. As a magnetizable structure passes sufficiently close to the sensor an electrical current is developed in the conductor. The electrical output of the conductor is a signal pulse. For every change in magnetizable material which passes the sensor, a unique signal pulse will be produced. Thus in the case of the teeth of a gear, a pulse will be produced upon detection of each tooth as it passes. The distance between pulses and the length of the pulses depends on the speed at which the gear is turning.

The comparing means 25 receives the output pulses from the sensors 31 and 32 and is able to detect minute changes in the relative angular speeds of the first and second rollers 11 and 12. The comparing means used in the experimental model in this case is a programmable counter timer, Model 110B manufactured as a laboratory instrument by Monsanto Company. This instrument is used to count the analog signal pulses produced by the magnetic sensors 31 and 32. The digital signal outputs from this instrument may then be compared, or in this case subtracted to determine the difference in pulse counts This operation is performed by any of a number of known digital adders, i.e., negating one count and adding to the other count.

Figure 2:
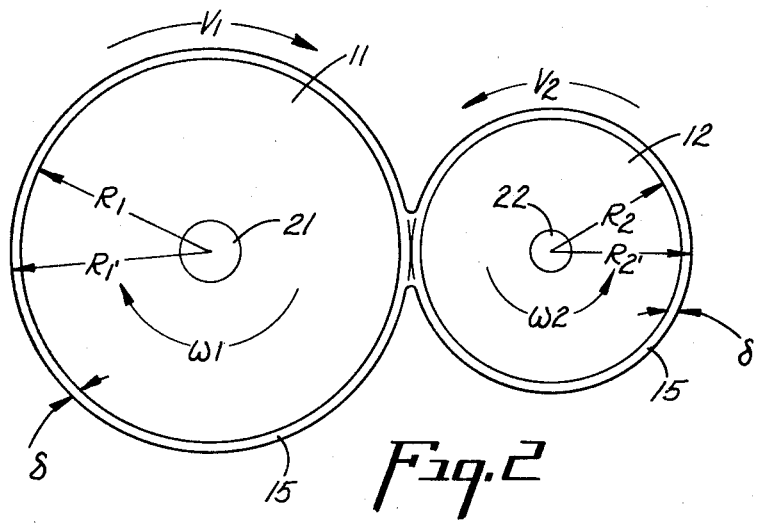
FIG. 2 illustrates a first and a second roll shown in FIG. 1 to explain the theory of operation of the invention.

The operation of the viscous fluid thickness gauge can best be appreciated in conjunction with FIG. 2. FIG. 2 shows the first and second rolls 11 and 12 each having a layer of viscous fluid 15 and each in effective contact with one another. The viscous fluid is transferred between the first and second rolls to be equally distributed on the rolls having a thickness $\delta$. The first roll 11 has a radius $R_1$, an effective radius $R_1'$ and rotates at an angular speed $\omega_1$, whereas the second roll 12 has a radius $R_2$, an effective radius $R_2'$ and rotates at an angular speed $\omega_2$. The first roll 11 is driven by means 28 which in turn drives the second roll 12 by the frictional force of the effective contact between the first and second rolls. The peripheral speeds $V_1$ and $V_2$ of the first and second rolls are given by:

$$V_1 = R_1' \omega_1 \quad V_2 = R_2' \omega_2$$

Since $R_1'$ and $R_2'$ are in effective contact and under a negligible slippage condition; therefore: $V_1 = V_2$ and $$R_1' \omega_1 = R_2' \omega_2 \tag{1}$$

A thickness $\delta$ of viscous fluid is distributed on the first and second rolls 11 and 12 and the effective radii $R_1'$ and $R_2'$ can be expressed as:

$$R_1' = R_1 + \delta \tag{2}$$

$$R_2' = R_2 + \delta \tag{3}$$

where $R_1 \neq R_2$ substituting Equations (2) and (3) into Equation (1):

$$R_1 \omega_1 + \delta \omega_1 = R_2 \omega_2 + \delta \omega_2$$

solving for $\delta$:

$$\delta = (R_2 \omega_2 - R_1 \omega_1)/(\omega_1 - \omega_2) \tag{4}$$

Equation (4) indicates that the thickness $\delta$ can be determined in terms of the readily measurable parameters $R_1$, $R_2$, $\omega_1$ and $\omega_2$.

If an electronic measuring system is to be used to determine the fluid thickness as illustrated in FIG. 1 and if $N_1$ and $N_2$ is the number of pulses received per unit time by the sensors 31 and 32, respectively, and $K_1$ and $K_2$ are proportionality constants equal to the number of teeth 37 and 38 on gears 35 and 36, respectively, then:

$$N_1 = K_1 \omega_1 \tag{5}$$

$$N_2 = K_2 \omega_2 \tag{6}$$

Substituting Equations (5) and (6) into Equation (4) and simplifying:

$$\delta = (R_2 N_2 K_1 - R_1 N_1 K_2)/(K_2 N_1 - K_1 N_2) \quad (7)$$

Equation (7) indicates that an expression containing ratio of the pulses $N_1$ and $N_2$ is the desired parameter to be measured to indicate the fluid thickness $\delta$. However, where the ink thickness $\delta$ is small in comparison to the radii $R_1$ and $R_2$, the change in angular speed will be small, and several simplifications can be made. These simplifications are possible due to the linear relationship between the ink thickness and the ratio of the radii when the ink thickness is small.

The constants $K_1$ and $K_2$ can be chosen in such a way that when:

$$\delta = 0, N_1 = N_2, \text{ then:}$$
$$K_2 R_1 = K_1 R_2 \quad (8)$$

Rearranging Equation (7) and substituting Equation (8):

$$(K_2 N_1 - K_1 N_2) \delta = R_1 K_2 (N_2 - N_1) \quad (9)$$

The difference in pulse counts per unit time $\Delta$ from sensors 31 and 32 may be expressed as:

$$\Delta = N_2 - N_1 \quad (10)$$

Rearranging Equation (9) and substituting Equation (10):

$$N_2 - N_1 = \delta N_1 (K_2 - K_1) - \Delta K_1 / R_1 K_2 \quad (11)$$

since $\Delta << N_1$ and $K_2 - K_1 < K_1$, however $K_2 - K_1 >> \Delta$ due to the dependence of N upon the angular velocity of the cylinder making this difference $\Delta$ very small: then $$N_2 - N_1 \cong \delta N_1 (K_2 - K_1)/R_1 K_2 \quad (12)$$

$N_1$ is the number of pulses per unit time of the driving roll 11 which rotates at a substantially constant angular speed; therefore:

$$N_1 (K_2 - K_1)/R_1 K_1 \cong c = \text{constant} \quad (13)$$

and Equation (12) reduces to:

$$\delta \cong 1/c (N_2 - N_1) \quad (14)$$

Where the fluid thickness is small in comparison to the radii of the rolls, typically 0.01 – 0.1 percent, to cause only minute changes in effective radii and rotational speeds, the difference between the pulse counts $(N_2 - N_1)$, Equation (14), is approximately as linear with respect to the viscous fluid thickness as the ratio of the pulse count in Equation (7). Under these conditions, simply subtracting the pulse count $N_1$ from the pulse count $N_2$ with a standard electronic counting device will indicate the viscous fluid thickness. This allows means 25 comparing the angular speeds of the first and second rolls 11 and 12 to be produced at an economical price.

The simplifications of Equation (7) can be checked by applying Equation (14) to a case of a typical ink roll in a printing machine. Assume that $R_1 = 2.0$ inch, $R_2 = 1.0$ inch, $K_1 = 40$ teeth, $K_2 = 20$ teeth and that roll 11 rotates at 300 R.P.M. The ink thickness will generally be between 0.0005 inch and 0.002 inch.

If no ink is applied to the rolls, then using Equations (5) and (6) $N_1 = N_2 = 12000$ pulses per minute.

When ink is applied on the rolls 11 and 12 and a difference of 6.0 pulses per minute is measured, then by Equation 10, $N_1 = 12000$ and $N_2 = 11,994$ pulses per minute.

Substituting these values into Equation (7):

$$\delta = [ (1.0)(11994)(40) - (2.0)(12000)(20) ]/[ (20)(12000) - (40)(11994) ]$$

$$\delta = 0.001001 \text{ inches thick.}$$

Using the same data to evaluate the constant c in Equation (13) yields:

$$c = [ (12000)(20-40) ]/[ (2.0)(20) ]$$

$$c = -6000 \text{ pulses per inch.}$$

Now the thickness can be approximated by the product of the difference in pulse count $\Delta$ and the reciprocal of the constant c as shown in Equation (14)

$$\delta \cong [ 1/(-6000) ] [ 11994 - 12000 ]$$

$$\delta \cong 0.001 \text{ inches thick,}$$

which is in error with the true value determined by Equation (7) by 0.1 percent indicating the approximations were valid.

The comparing means 25 also includes an indicator means 40 which can continuously indicate the thickness of the fluid on the roll 11. In addition, the means 25 includes a variable preset thickness means 43 and means sensing the difference between the preset thickness means and the detected thickness of the viscous fluid.

Since the difference in pulse counts is a direct result of the thickness of the film, the variable preset thickness means need only be manufactured digital signal representing the desired pulse count difference. By comparing the actual difference and this manufactured digital signal i.e., adding the negative of one to the other as before, a positive, negative or zero valued difference is produced.

The output 45 of this difference between the preset thickness and the detected thickness, is applied to a control means 41 to control the means a viscous fluid on the roll 14 to produce a preset thickness of fluid on the roll. The control means 41 is shown connected to the fourth roll 14 by a dashed line indicating a control of the viscous fluid from the supply 17, to the fourth roll 14. This control can be accomplished in any number of ways known to the prior art, including a doctor blade, controlling the rotation of the fourth roll, or controlling the pressure between third and fourth roll 13 and 14. The control signal 45 directs the movement of the control means depending on its value. A zero value results in no change in the present setting of the control means. However, a positive or negative value for the difference signal results in moving of the control means to affect either a thicker or thinner film thickness depending on which signal is negated in the comparison of variable preset thickness means and the dependent thickness.

The comparing means could also include a mechanical comparator such as a differential. In such a case, each roll would drive an input of the differential with the output being connected to an indicator or a control function or both.

A low-cost gauge of the disclosed invention has been constructed by the inventor and installed upon a printing machine. The results have shown that the viscous fluid thickness gauge is capable of making accurate and consistent measurements on printing rolls, typically one to two inches in diameter, with ink thicknesses of 0.0005 to 0.0002 inches. This further demonstrated that the viscous fluid thickness gauge can be installed on existing printing machines with little or no modification of the printing machine.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A method for measuring the thickness of an ink coating in a printing machine on first and second rotatably mounted rolls having caused the ink to coat both rolls uniformly through rolling contact, comprising:
   driving said second roll solely by contact with said first roll;
   allowing the axis of said second roll to move in accordance with changes in effective radii of said rolls due to changes in said ink coating thickness;
   detecting the angular speeds of said rolls by means of pulse generators rotating with said rolls;
   comparing the angular speed of said rolls as said speeds change relative to one another due to the changes in effective radii caused by ink thickness changes;
   determining the thickness of said ink coating as a function of the angular speeds of said rolls and the distance which the axis of said second roll moves; and
   increasing or decreasing the rate of ink application to said first roll to maintain the desired thickness.

* * * * *